United States Patent
Mitchell, Jr.

(10) Patent No.: US 6,696,127 B1
(45) Date of Patent: Feb. 24, 2004

(54) DIFFERENTIAL PERFORATION PATTERN FOR DISPENSING PRINT MEDIA

(75) Inventor: Chauncey T. Mitchell, Jr., Lakeland, TN (US)

(73) Assignee: Translucent Technologies LLC, Algoma, WI (US)

(*) Notice: Subject to any disclaimer, the term of this patent is extended or adjusted under 35 U.S.C. 154(b) by 130 days.

(21) Appl. No.: 10/037,824

(22) Filed: Nov. 9, 2001

Related U.S. Application Data

(60) Provisional application No. 60/248,143, filed on Nov. 13, 2000.

(51) Int. Cl.[7] .................................................. B32B 3/10
(52) U.S. Cl. ....................................................... 428/43
(58) Field of Search ........................................... 428/43

(56) References Cited

U.S. PATENT DOCUMENTS

| | | | |
|---|---|---|---|
| 3,226,527 A | 12/1965 | Harding | 219/384 |
| 3,351,740 A | 11/1967 | Heuer | 219/384 |
| 3,622,751 A | 11/1971 | Larive et al. | 219/384 |
| 3,783,237 A | 1/1974 | McArthur | 219/384 |
| 3,847,047 A | 11/1974 | Jackson | 83/344 |
| 3,855,890 A | 12/1974 | Lynch et al. | 83/331 |
| 3,866,497 A | 2/1975 | Wolfberg et al. | 83/30 |
| 4,214,024 A | 7/1980 | Jacobson | 428/41 |
| 4,253,010 A | 2/1981 | Brown et al. | 219/384 |
| 4,314,142 A | 2/1982 | Brown et al. | 219/384 |
| 4,512,472 A | 4/1985 | Jarund | 206/443 |
| 4,563,228 A | 1/1986 | Luders et al. | 156/64 |
| 4,570,797 A | 2/1986 | Weinman | |
| 4,982,845 A | 1/1991 | Prascak et al. | 206/621 |
| 5,188,370 A | 2/1993 | Vlahos | 273/269 |
| 5,198,275 A | 3/1993 | Klein | 428/43 |
| 5,372,494 A | 12/1994 | Vaughan | 425/196 |
| 5,444,035 A | 8/1995 | Perrington et al. | 503/201 |
| 5,550,346 A | 8/1996 | Andriash et al. | 219/121.72 |
| 5,556,826 A | 9/1996 | Perrington et al. | 503/200 |
| 5,557,311 A | 9/1996 | Perrington et al. | 347/111 |
| 5,562,964 A | 10/1996 | Jones | 428/43 |
| 5,797,484 A | 8/1998 | Sentementes | 206/164 |
| 6,228,454 B1 * | 5/2001 | Johnson et al. | 428/43 |
| 6,368,689 B1 * | 4/2002 | Connor Sledge et al. | 428/43 |

* cited by examiner

Primary Examiner—Alexander S. Thomas
(74) Attorney, Agent, or Firm—Brian B. Shaw, Esq.; Thomas B. Ryan; Harter, Secrest & Emery LLP

(57) ABSTRACT

A web of print media dispensable as individual sheets along lines of perforation includes a pattern of ties and slits that provide a more predictable resistance to manually separating the sheets from the web. The lines of perforation extend transversely with respect to a longitudinal dimension of the web and cross a longitudinal centerline between two edges of the web. The ties are weaker near the centerline of the web than near either of the two edges sufficient to relatively increase resistance to tearing along the lines of perforation starting near either of the two edges while relatively decreasing resistance to tearing along the same lines of perforation starting near the centerline of the web.

5 Claims, 4 Drawing Sheets

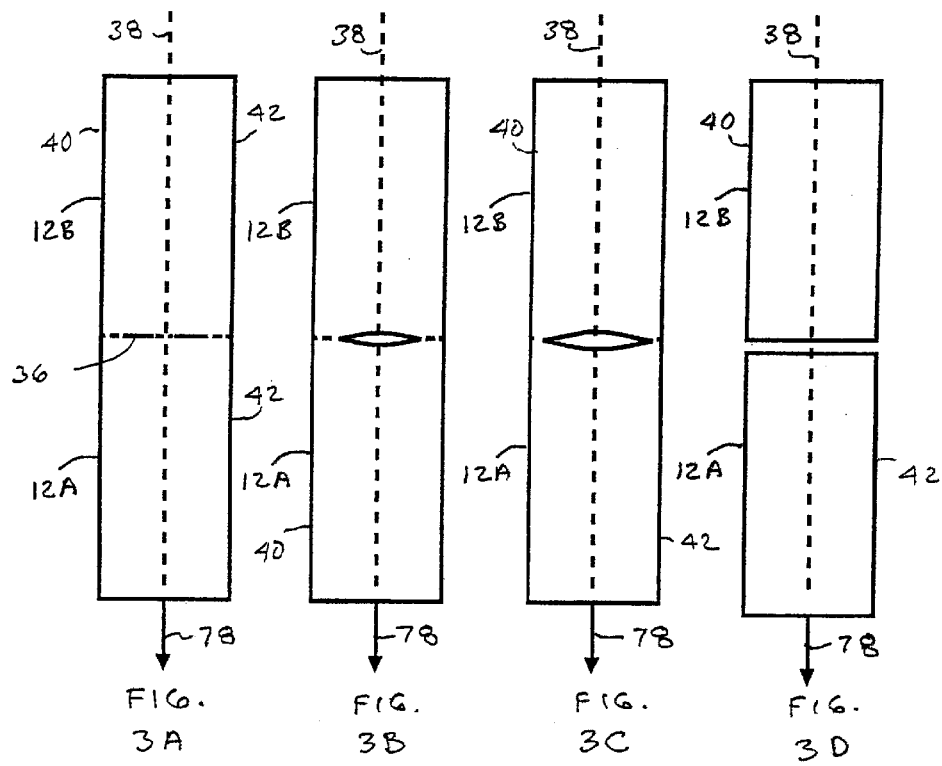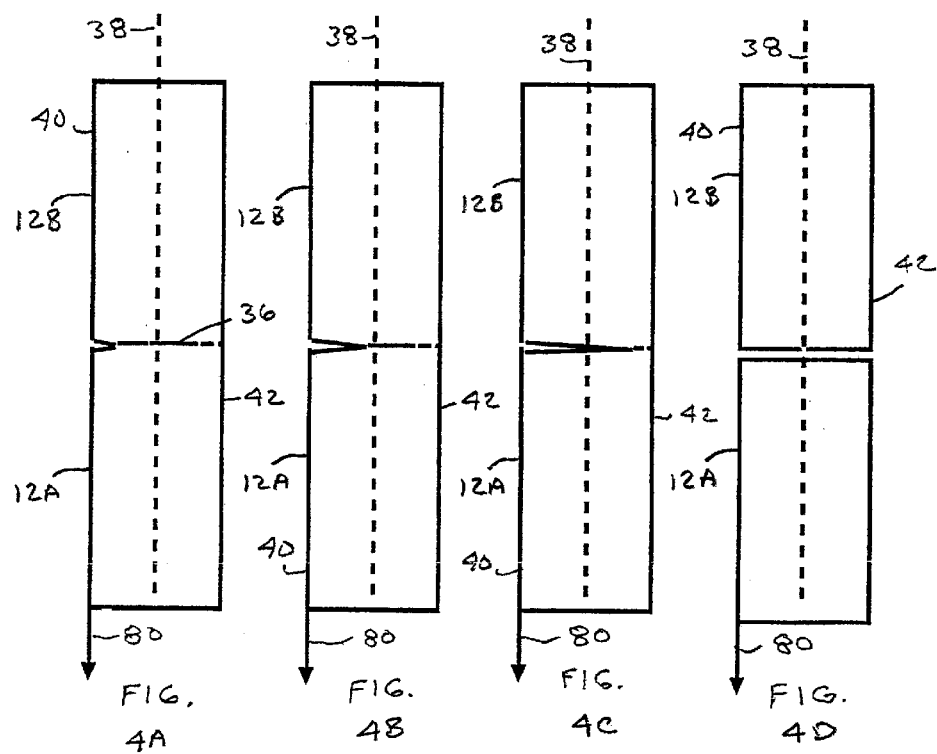

DIFFERENTIAL PERFORATION PATTERN FOR DISPENSING PRINT MEDIA

This application claims the benefit of U.S. Provisional Application No. 60/248,143, filed on Nov. 13, 2000, which provisional application is incorporated by reference herein.

TECHNICAL FIELD

Perforations provide a mechanism for dividing a web of print media into individually dispensable sheets.

BACKGROUND

Relevant printing systems dispense individually printed sheets from a continuous web of print media. The individual sheets can be dispensed to recipients by automated cutting or manual tearing of the sheets from the web. However, automated cutting adds mechanical complexity, imposes servicing requirements, and subjects printing systems to mechanical breakdown. Manual tearing shifts some of this burden onto recipients for carrying out the necessary operations. In addition, tearing can produce ragged edges and disturb registration of the print media within the printer.

Perforations have been used to assist tearing along designated lines. However, the amount of force required to tear even perforated lines can vary widely depending upon the direction and position at which the tear forces are applied. Braking mechanisms, which add problems similar to those of automated cutting mechanisms, are sometimes needed to maintain proper registration of the print media within the printers.

So-called "slits" separated by uncut portions referred to as "ties" form the perforated lines, which can extend from one edge to another through a center of the web. Tearing is accomplished most efficiently by applying tensile forces in offset positions that concentrate the tensile forces through one tie at a time. As each tie breaks, the tensile forces shift to the next adjacent tie. Ordinarily, such tearing starts by breaking ties near one edge of the web and proceeds by breaking ties in succession through the center to the other edge of the web.

Other more centered positions for applying tensile forces can distribute the tensile forces through more than one tie at a time. Bursting is accomplished by breaking at least some or all of the ties between both edges of the web at once. The tensile forces required to break all of the ties simultaneously are much higher than those required to break the same ties in succession. Breaking a smaller grouping of the ties simultaneously requires tensile forces intermediate to those required for breaking the ties individually or all at once.

Such wide variability in the tensile forces required to manually separate individual printed sheets along lines of perforation also requires a corresponding capacity for high braking forces and imposes inconsistent demands on recipients to perform the tearing operation. The tensile forces required for bursting all of the ties or even some groupings of the ties can easily exceed reasonable levels for performing manual operations of this sort.

One solution is to weaken the ties to reduce the maximum tensile force required to burst the ties simultaneously. However, the weakened ties also lower the minimum tensile forces required to tear the ties in succession. Such weakened webs are subject to breakage during in-line manufacture, loading into the printer, and subsequent feeding through the printer.

SUMMARY OF INVENTION

My invention improves the dispensing of perforated sheets from printers and other dispensing devices by reducing variability among tensile forces required to separate the perforated sheets from webs throughout a range of positions at which the tensile forces can be applied. Initiating tearing actions along lines of perforations at one edge or the other of the webs is made relatively more difficult, while initially bursting ties located near the centers of the webs is made relatively easier. For example, perforation patterns can be arranged in accordance with my invention to support a controlled bursting sequence in which ties break in pairs, starting at the web center and proceeding simultaneously toward both edges.

Ordinarily, the minimum tensile forces required to tear lines of perforation are applied from offset positions that initially stress and break the ties located along one of the web edges and proceed by stressing and breaking the remaining ties one at a time. My invention can sustain or even enlarge these minimum tensile forces by maintaining or increasing the strength of ties located near the opposite edges of the webs.

The maximum tensile forces ordinarily required to tear lines of perforation are applied through all of the ties at once. My invention reduces the maximum tensile forces by weakening the ties located at or near the centers of the webs so that these ties break in advance of the rest. Due to the flexible nature of webs, tensile forces applied from the same centered positions stress and break the next adjacent ties paired on opposite sides of the web centers. The remaining ties paired on opposite sides of the web centers are stressed and broken in succession. Thus, even where tensile forces are applied in a manner that initially stresses all of the ties, the ties are still broken in a sequence that greatly reduces the maximum tensile forces.

One example of my new in-line supply of print media is arranged as a web of printable media having regularly spaced lines of perforation that separate the web into individually dispensable sheets. The lines of perforation extend transversely with respect to a longitudinal dimension of the web crossing a longitudinal centerline between two edges of the web. A pattern of ties separated by slits extend along the lines of perforation. The ties occupy a larger portion of the lines of perforation adjacent to the edges of the web than adjacent to the centerline of the web sufficient to relatively increase resistance to tearing near either of the two edges while relatively decreasing resistance to tearing starting near the centerline of the web.

Preferably, the ties located closest to the centerline of the web are weaker than the ties located closest to the edges of the web along the lines of perforation. In addition, the ties are preferably unevenly spaced along the lines of perforation with enlarged spacings separating the ties located closest to the centerline of the web from the remaining ties located closer to the two edges of the web. Once the weaker ties located closest to the centerline of the web have burst, the enlarged spacings encourage the web to pucker, thereby allowing the remaining stronger ties to break in succession from both sides of the web centerline.

The print media itself is preferably made of a flexible non-elastic material. The flexibility permits puckering, while the non-elasticity permits the concentration of tensile forces through limited numbers of ties. Each of the sheets of print media can be individually printed by the printer prior to being dispensed from the printer. One example is a thermal paper having a surface coated with a thermosensitive material that forms images in response to the application of heat in patterns. Tensile forces applied along the centerline of the web between adjacent sheets rupture the ties along the intervening line of perforation in a sequence starting with the ties located closest to the centerline of the web and proceeding in opposite directions through the remaining ties located closer to the two edges of the web. Alternatively, tensile forces applied along either edge of the web can rupture the ties in a more usual sequence starting at one edge and proceeding tie-by-tie to the other edge. However, regardless of where the tensile forces are applied between the edges of the web, comparable tensile forces are required to separate the printed sheets from the web.

DRAWINGS

FIG. 1 diagrams my printing system tracing a pathway for printing and dispensing sheets from a fan-folded web of print media.

FIGS. 3A–3D depicts an expected sequence of tearing actions between the two sheets of scrip associated with tensile forces applied along a longitudinal centerline of the web.

FIGS. 4A–4D depicts another sequence of tearing actions between the two sheets of scrip associated with tensile forces applied along an edge of the web.

Figure 5:
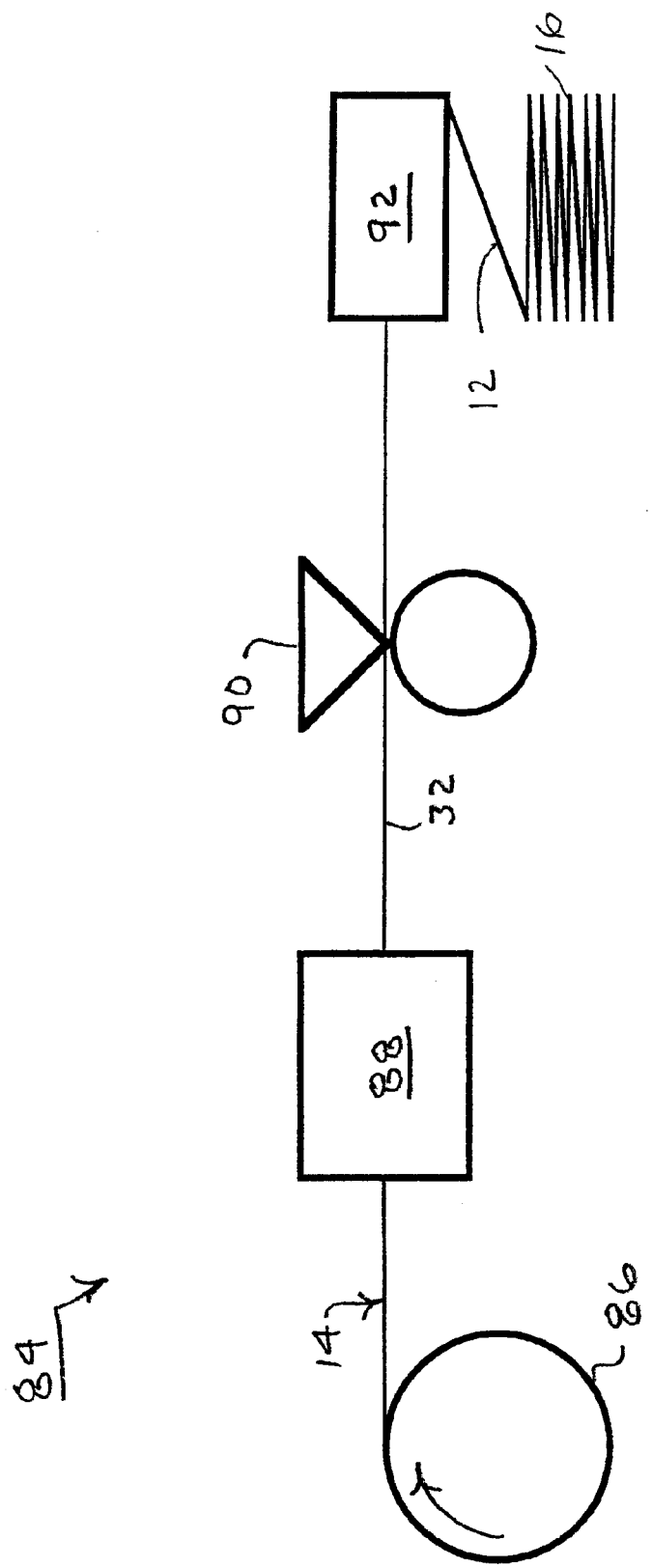

FIG. 5 diagrams an in-line system for making the web of print media with lines of perforation dividing the web into separately dispensable sheets.

DETAILED DESCRIPTION

Figure 1:
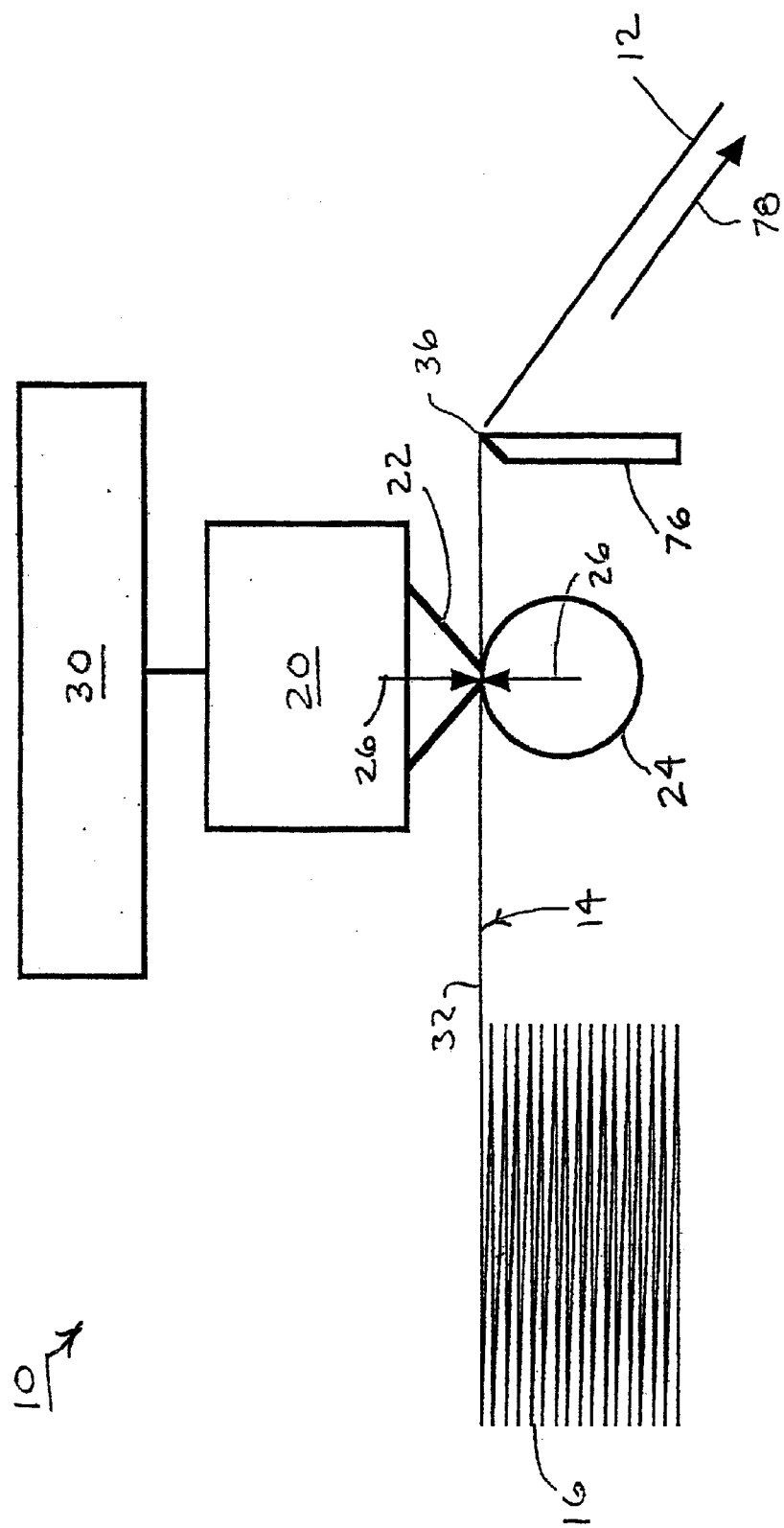

An exemplary printing/dispensing system 10 depicted in FIG. 1 dispenses sheets 12 from a web of print media 14 arranged in a fan-folded stack 16. The web of print media 14 advances through a printer 20 that pinches the web 14 between a print head 22 and a drive platen 24. Friction generated by this pinching action represented by arrows 26 imparts either a driving force or a braking force on the web 14 for preserving a desired registration of the web 14 with the print head 22.

The printer 20 is preferably a thermal printer under control of a processor 30. The web of print media 14 is preferably a thermal paper having a thermosensitive coating 32 on a surface adjacent to the print head 22. Heat applied in patterns by the print head 22 produces images in the thermosensitive coating 32. Alternatively, ink jet paper or other printable media separable along lines of perforation could also be used in connection with an ink jet or other print-on-demand printer. The printed images can be unique to the individual sheets 12 and related by the processor 30 to local or remote events.

Although shown in a fan-folded stack 16, the web 14 could also be arranged in a roll or other form for supplying an unbroken stream of the sheets 12. Other printers, including ink jet and laser printers, could also be used with different webs of compatible print media. A separate braking mechanism under the control of the processor 30 could also be used to augment or replace the braking interface of the print head 22 and platen 24.

Figure 2:
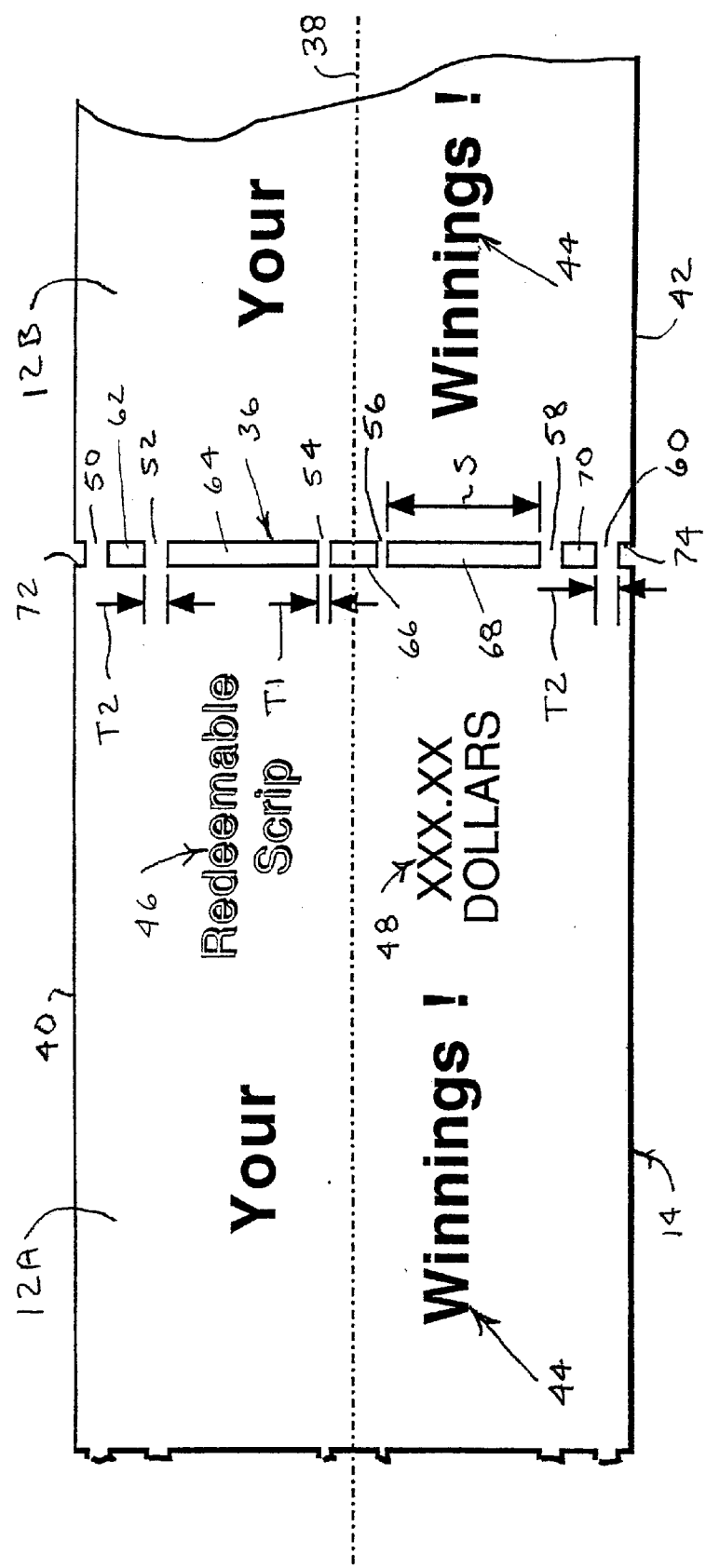
FIG. 2 illustrates two of the sheets in the form of scrip broken away from the web and divided from each other by a line of perforation that is enlarged to more clearly show a modified pattern of ties and slits.

In the enlarged view of FIG. 2, the sheets 12, which are depicted as sheets 12A and 12B of scrip, are separated from each other along the web 14 by lines of perforation 36 that extend transversely with respect to a longitudinal dimension of the web, crossing a longitudinal centerline 38 between two edges 40 and 42 of the web 14. The scrip sheets 12A and 12B are preprinted with repeating indicia 44 and 46, but also contain unique information 48 added by the printer 20. For example, the printer 20 can print dollar amounts on the scrip sheets 12A and 12B in accordance with instructions from the processor 30.

The lines of perforation 36 contain ties 50, 52, 54, 56, 58, and 60 separated by slits 62, 64, 66, 68, and 70. Additional slits 72 and 74 separate the ties 50 and 60 from the two edges 40 and 42 of the web 14 to resist any tendency to scallop the edges 40 and 42 during separation of the sheets 12A and 12B. The ties 54 and 56 located closest to the centerline 38 of the web 14 are thinner or otherwise weaker than the remaining ties 50, 52, 58, and 60 located closer to the two edges 40 and 42 of the web 14. For example, the ties 54 and 56 have a width dimension "T1" that is thinner than a width dimension "T2" of the ties 50, 52, 58, and 60. In addition, the ties 54 and 56 are separated from their next closest ties 52 and 58 by slits 64 and 68 that have a width dimension "S" that is much greater that the unlabeled width dimensions of the remaining slits 62, 66, 70, 72 and 74.

After printing, the web 14 is advanced past a burster bar 76 (shown in FIG. 1) into a position at which the closest line of perforation 36 overlies the burster bar 76. Tensile forces 78 applied manually to the scrip sheet 12A along the centerline 38, as also shown in the sequence of drawing FIGS. 3A–3D, are opposed by braking forces applied by the printer 20 to the scrip sheet 12B lying between the closest line of perforation 36 and the remaining portion of the web 14. The burster bar 76 provides an edge that concentrates a component of the tensile forces 78 normal to the lines of perforation 36.

The ties 54 and 56 closest to the centerline 36 (see also FIG. 2) are preferably stressed at least as much as the other ties 50, 52, 58, and 60 located closer to the two edges 40 and 42 of the web and are weaker than the other ties (e.g., by at least 20 percent). As a result, the ties 54 and 56 tend to rupture (break) in advance of the other ties 50, 52, 58, and 60 as shown in FIG. 3B. The partly separated web 14 is flexible yet sufficiently inelastic to transfer the tensile forces 78 around the extra wide span of the slits 64 and 68 to the next closest ties 52 and 58.

A puckering action through the span of the extra wide slits 64 and 68 distorts the web 14 from a planar form and concentrates the tensile forces 78 through the next closest ties 52 and 58, thereby rupturing these ties as shown in FIG. 3C and transferring the tensile forces 78 to the last remaining ties 50 and 60 located closest to the web edges 40 and 42. An expanded puckering action concentrates the tensile forces 78 through these remaining ties 50 and 60, resulting in their rupture and a complete separation of scrip sheet 12A from the scrip sheet 12B as shown in FIG. 3D.

Although all of the ties 50, 52, 54, 56, 58, and 60 can be initially stressed by the tensile forces 78 applied along the centerline 38, the relative weakening of the centermost ties 54 and 56 together with a controlled distortion of the web 14 permits the tensile forces 78 to break the remaining ties in a succession of tie pairs 54 and 56, 52 and 58, and 50 and 60. The breakage of the ties 50, 52, 54, 56, 58, and 60 in the prescribed succession significantly reduces the overall magnitude of the tensile forces 78 required to separate the scrip sheet 12A from the remaining portion of the web 14 with respect to the overall magnitude of the tensile forces required to achieve the same objective by breaking all of the ties 50, 52, 54, 56, 58, and 60 at once.

The overall magnitude of the tensile forces 78 is comparable to the overall magnitude of tensile forces 80 applied manually along the edge 40 of the web for rupturing the ties 50, 52, 54, 56, 58, and 60 according to a more conventional tearing action depicted in the drawing FIGS. 4A–4D. Here, the tearing begins at the tie 50 located closest to the edge 40 and proceeds one-by-one through the remaining ties in their listed order 52, 54, 56, 58, and 60 without regard to the relative strengths of the ties. In fact, the relatively weakened ties 54 and 56 have little or no effect on the overall magnitude of the tensile forces 80 because the relatively stronger ties 50, 52, 58, and 60 are also separately broken in the same sequence. Similar results can be expected for tensile forces applied along the opposite edge 42.

Thus, the tensile forces 78 applied along the centerline 38, which would otherwise be unacceptably high, are significantly reduced; and the tensile forces 80 applied along either of the edges 40 or 42, which are ordinarily much lower, are substantially maintained. The similarity of the overall magnitudes of the tensile forces 78 and 80 without regard to the positions at which these forces are applied between the edges 40 and 42 allows the script sheet 12A to be gripped through the same range of positions and separated from the remaining portion of the web 14 by a more consistent and predictable exertion of manual force.

Many other combinations and patterns of ties and slits following these general practices can be arranged to achieve similar goals. For example, more or less ties can be used. The ties could also be made progressively stronger approaching both edges 40 and 42 of the web to further promote a controlled bursting sequence starting near the centerline 38 and proceeding towards both edges 40 and 42. Relatively strengthening the ties 50 and 60 closest to the edges 40 and 42 of the web 14 can be used to relatively increase resistance to tearing actions starting at either edge 40 or 42 without unduly increasing resistance to tearing starting near the centerline 38.

The web 14 of print media is preferably manufactured by an inline press 84 such as shown in FIG. 5. A roll 86 unwinds the web 14 of print media into the press 84 for a sequence of processing operations. A printing station 88, which is representative of a plurality of printing and surface treating stations, applies the repeating indicia 44 and 46 to the web 14. A die cutting station 90 cuts the lines of perforation 36 into the web 14 at regularly spaced intervals in registration with the printing operations for dividing the web into the individually dispensable sheets 12. A folding station 92 folds the web into the fan-folded stack 16 that can be inserted into the printing/dispensing system shown in FIG. 1.

Additional or replacement operations can be performed along the in-line press for adapting the sheets 12 for a variety of purposes, including couponing and labeling. During manufacture, the webs can contain more than one width of the sheets 12 and can be longitudinally sliced into multiple webs of dispensable sheets. The printing operations are preferably performed flexographically; but other in-line printing processes can also be used, such as variable imaging, letterpress, rotogravure, and screen printing. The web of print media 14 is preferably a thermal paper, but other paper or media products, such as conventional bonded or ink jet paper, having the requisite flexibility and inelasticity can also be used. The in-line press operations can be performed on a single press, or the operations can be divided among a plurality of presses. For example, the printing operations can be performed on one press, and the perforating and folding functions can be performed on another press. Registration marks printed on the webs can be used to synchronize the presses.

The web of print media 14 can be printed in advance of being mounted in the dispensing system 10 or can be printed just prior to dispensing. Examples of such dispensable print media include tags, tickets, coupons, and labels. For most such uses, at least some printing is preferably completed before the media is loaded into the dispensing system 10. Links between the processor 30 and internal or external information systems can be established to print unique information on the sheets 12 within the dispensing system 10 prior to the intended separation of the sheets 12 from the remaining print media 14. In place of a printer within the dispensing system 10, a stand-alone braking mechanism can be used to prevent the sheets from being prematurely dispensed before the sheets have been separated from the web 14 along the lines of perforation 36.

I claim:

1. An in-line supply of a print media that can be entirely separated and individually dispensed in succession comprising:

a web of printable media having regularly spaced lines of perforation for separating the web into individually dispensable sheets;

the lines of perforation extending transversely with respect to a longitudinal dimension of the web and crossing a longitudinal centerline between two edges of the web;

a pattern of ties separated by slits extending along the lines of perforation;

the ties occupying a larger portion of the lines of perforation adjacent to the edges of the web than adjacent to the centerline of the web sufficient to relatively increase resistance to tearing along the lines of perforation starting near either of the two edges while relatively decreasing resistance to tearing along the same lines of perforation starting near the centerline of the web;

the ties located closest to the centerline of the web being weaker than the ties located closest to the edges of the web along the lines of perforation;

the ties located closest to the centerline of the web being narrower than the ties located closest to the edges of the web along the lines of perforation; and the ties located closest to the centerline of the web being formed in pairs evenly straddling the centerline.

2. An in-line supply of a print media that can be entirely separated and individually dispensed in succession comprising:

a web of printable media having regularly spaced lines of perforation for separating the web into individually dispensable sheets;

the lines of perforation extending transversely with respect to a longitudinal dimension of the web and crossing a longitudinal centerline between two edges of the web;

a pattern of ties separated by slits extending along the lines of perforation; and the ties occupying a larger portion of the lines of perforation adjacent to the edges of the web than adjacent to the centerline of the web sufficient to relatively increase resistance to tearing along the lines of perforation starting near either of the two edges while relatively decreasing resistance to tearing along the same lines of perforation starting near the centerline of the web;

wherein the web is made of a flexible non-elastic material.

3. The print media of claim 2 in which the web has front and back surfaces and is coated on its front surface with a thermosensitive material that forms images in response to the application of heat in patterns.

4. The print media of claim 3 in which a back side of the web is printed with a repeating pattern between the regularly spaced lines of perforation.

5. A method of making an in-line supply of a print media that can be entirely separated and individually dispensed in succession comprising;

- a web of printable media having regularly spaced lines of perforation for separating the web into individually dispensable sheets;
- the lines of perforation extending transversely with respect to a longitudinal dimension of the web and crossing a longitudinal centerline between two edges of the web;
- a pattern of ties separated by slits extending along the lines of perforation;
- the ties occupying a larger portion of the lines of perforation adjacent to the edges of the web than adjacent to the centerline of the web sufficient to relatively increase resistance to tearing along the lines of perforation starting near either of the two edges while relatively decreasing resistance to tearing along the same lines of perforation starting near the centerline of the web, comprising the steps of:

advancing the web of printable media along an in-line press and cutting the slits along successive lines of perforation; and folding the web of printable media along the successive lines of perforation into a stack.

* * * * *